(12) United States Patent
Smith et al.

(10) Patent No.: US 12,265,358 B2
(45) Date of Patent: *Apr. 1, 2025

(54) OUT-OF-PLANE COMPUTER-GENERATED MULTICOLOR WAVEGUIDE HOLOGRAPHY

(71) Applicant: Duke University, Durham, NC (US)

(72) Inventors: David R. Smith, Durham, NC (US); Zhiqin Huang, Chapel Hill, NC (US); Daniel L. Marks, Durham, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 18/149,253

(22) Filed: Jan. 3, 2023

(65) Prior Publication Data

US 2023/0141643 A1    May 11, 2023

Related U.S. Application Data

(62) Division of application No. 16/459,045, filed on Jul. 1, 2019, now Pat. No. 11,543,774.

(60) Provisional application No. 62/692,907, filed on Jul. 2, 2018.

(51) Int. Cl.
*G03H 1/26* (2006.01)

(52) U.S. Cl.
CPC ....... *G03H 1/2645* (2013.01); *G03H 2222/13* (2013.01); *G03H 2223/23* (2013.01); *G03H 2225/12* (2013.01)

(58) Field of Classification Search
CPC ............. G03H 1/2645; G03H 2222/13; G03H 2223/23; G03H 2225/12; G03H 2223/16
USPC .......................................................... 359/34
See application file for complete search history.

(56) References Cited

U.S. PATENT DOCUMENTS

| | | | |
|---|---|---|---|
| 5,410,622 A * | 4/1995 | Okada | H01L 31/0236 257/E31.127 |
| 6,567,573 B1 | 5/2003 | Domash | |
| 7,205,960 B2 * | 4/2007 | David | G02B 27/4272 359/13 |
| 10,488,651 B2 * | 11/2019 | Kamali | G02B 5/0268 |
| 11,543,774 B2 * | 1/2023 | Smith | G03H 1/2645 |

(Continued)

FOREIGN PATENT DOCUMENTS

CN  104570353  4/2015

OTHER PUBLICATIONS

Deng et al., Metasurface Optical Holography, Material Today Physics, Nov. 2017, vol. 3, p. 16-32.

(Continued)

*Primary Examiner* — Audrey Y Chang
(74) *Attorney, Agent, or Firm* — PCFB, LLC; Justin K. Flanagan

(57) ABSTRACT

Various examples of out-of-plane multicolor waveguide holography systems, methods of manufacture, and methods of use are described herein. In some examples, a multicolor waveguide holography system includes a planar waveguide to convey optical radiation between a grating coupler and a metasurface hologram. The grating coupler may be configured to couple out-of-plane optical radiation of three different color incident at three different angles into the planar waveguide. The combined multicolor optical radiation may be conveyed by the waveguide to the metasurface hologram. The metasurface hologram may diffractively decouple the three colors of optical radiation for off-plane propagation to form a multicolor holographic image in free space.

8 Claims, 9 Drawing Sheets

(56) References Cited

U.S. PATENT DOCUMENTS

| | | |
|---|---|---|
| 2007/0188771 A1 | 8/2007 | Liu |
| 2010/0157400 A1 | 6/2010 | Dimov |
| 2011/0274393 A1 | 11/2011 | Reed |
| 2012/0039560 A1 | 2/2012 | Mazur |
| 2013/0100513 A1 | 4/2013 | Choi |
| 2014/0168735 A1 | 6/2014 | Yuan |
| 2018/0172988 A1 | 6/2018 | Ahmed |
| 2019/0056591 A1 | 2/2019 | Tervo |
| 2020/0272100 A1* | 8/2020 | Yu .................. G03H 1/0244 |

OTHER PUBLICATIONS

Duke University, PCT/US2019/040388, Written Opinion mailed Oct. 29, 2019, 11 pp.

Duke University, PCT/US2019/040388, International Search Report mailed Oct. 29, 2019, 4 pp.

Suhara, et al., Waveguide Holograms: A New Approach to Hologram Integration, Optics Communications; vol. 19, No. 3, Dec. 1976, p. 353-358.

Li, et al., Optical Waveguide Fan-Out Elements Using Discolated Gratings for Both Outcoupling and Phase Shifting, IEEE Photonics Technology Letters, vol. 8, No. 9, Sep. 1996, p. 1199-1201.

Li, et al., Off-Plane Computer-Generated Waveguide Hologram, IEEE Journal of Selected Topics in Quantum Electronics, vol. 2, No. 2, Jun. 1996, p. 226-235.

Li, et al., Multiplexed Computer-Generated Waveguide Hologram Using Gratings with Different Spatial Frequencies, IEEE Photonics Technology Letters, vol. 8, No. 12, Dec. 1996, p. 1653-1655.

Li, et al., Independent Image Replay in a Multiplexed Computer-Generated Waveguide Hologram Using Interlaced Gratings with Orthogonal Grooves, IEEE Photonics Technology Letters, vol. 10, No. 3, Mar. 1998, p. 385-387.

Jenishi et al., Rotation-Symmetric Multispot Focusing Phase-Shifted Grating Coupler for Integrated Semiconductor Laser, Japanese Journal of Applied Physics, 51 058001, 2012, 3 pp.

Bengtsson, et al., Diffractive Optics at the Surface of Light-Emitting/Receiving Semiconductor Components, Journal of Modern Optics, 47:13, p. 2455-2466.

Modh et al., Multifunctional Gratings for Surface-Emitting Lasers: Design and Implementation, Applied Optics, vol. 42, No. 24, Aug. 20, 2003, p. 4847-4854.

Oku, et al., High-Luminance See-Through Eyewear Display with Novel vol. Hologram Waveguide Technology, SID 2015 Digest, p. 192-195.

Fattal, et al., A Multi-Directional Backlight for a Wide-Angle, Glasses-Free Three-Dimensional Display, Nature, vol. 495, Mar. 21, 2013, p. 348-351.

Ozaki, et al., Surface-Plasmon Holography with White-Light Illumination, Science Magazine, vol. 332, Apr. 8, 2011, p. 218-220.

Smith et al., U.S. Appl. No. 16/459,045, Restriction Requirement mailed Jun. 28, 2021, 10 pp.

Smith et al., U.S. Appl. No. 16/459,045, Non-Final Office Action mailed Sep. 3, 2021, 10 pp.

Smith et al., U.S. Appl. No. 16/459,045, Final Office Action mailed Dec. 20, 2021, 15 pp.

Smith et al., U.S. Appl. No. 16/459,045, Non-Final Office Action mailed May 26, 2022, 16 pp.

\* cited by examiner

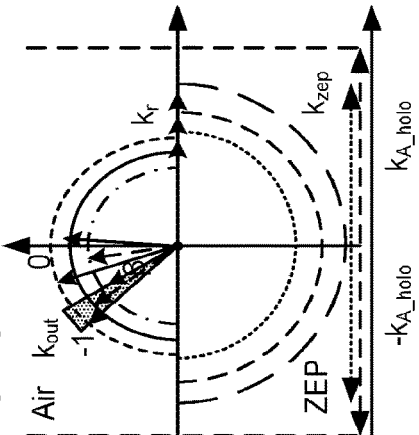
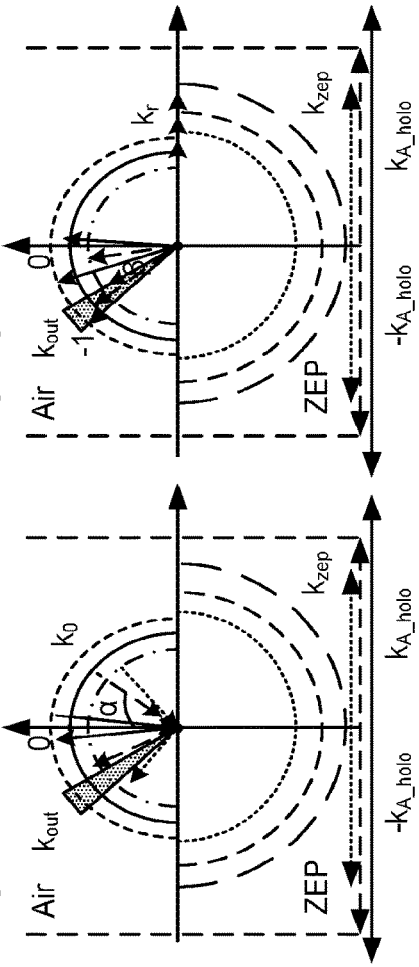
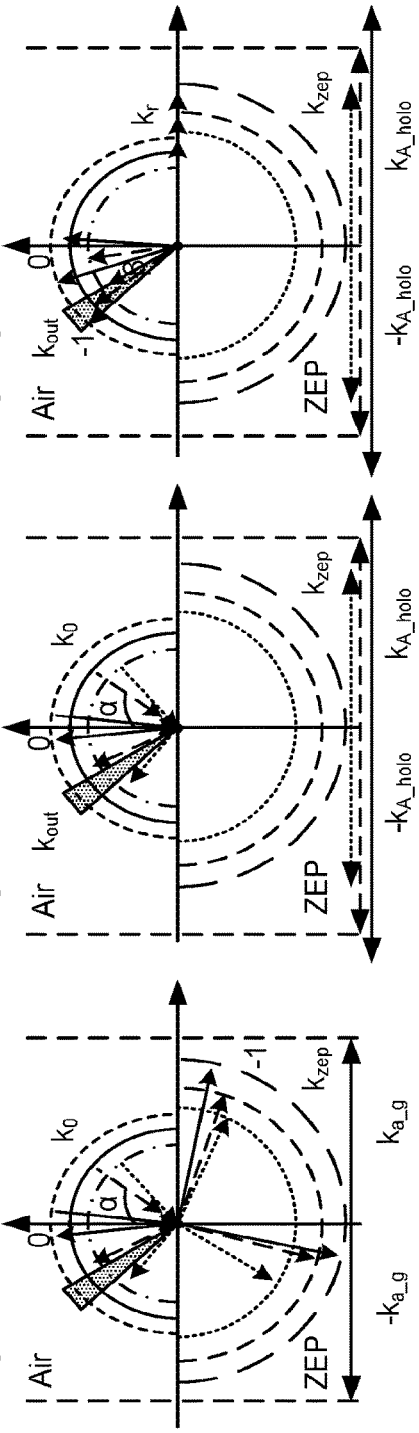
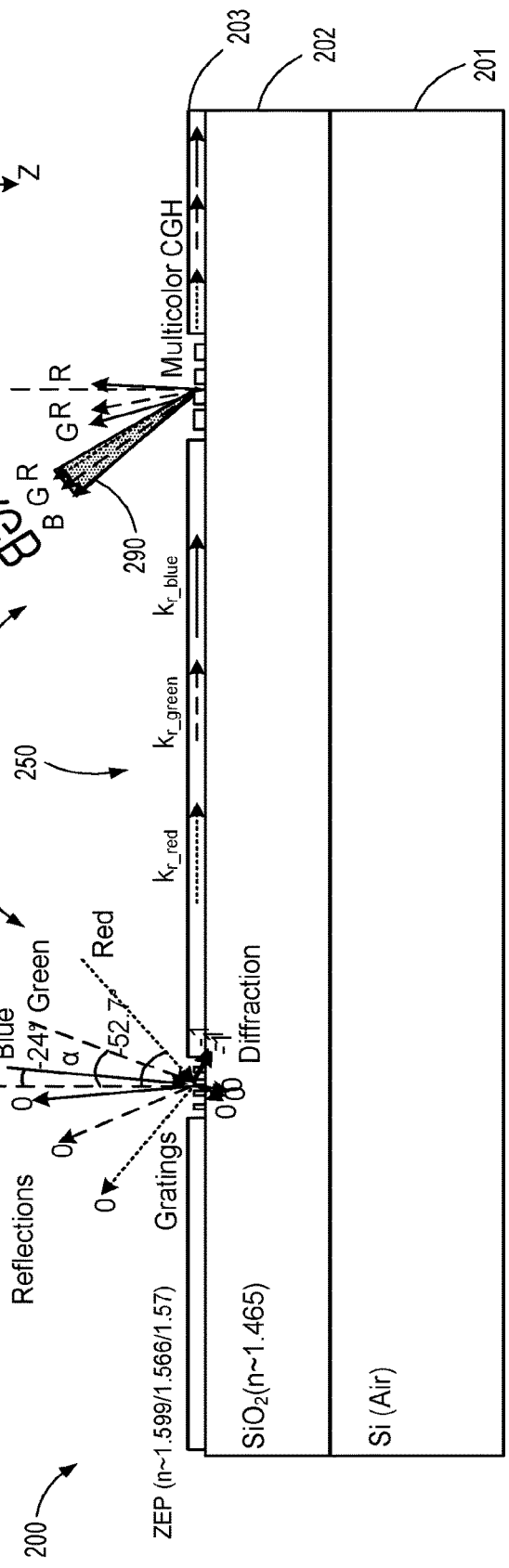

OUT-OF-PLANE COMPUTER-GENERATED MULTICOLOR WAVEGUIDE HOLOGRAPHY

FEDERAL FUNDING

These inventions were made with government support under Federal Grant Nos. FA9550-12-1-0491 and FA9550-18-1-0187 awarded by the AFOSR. The government has certain rights in the inventions.

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc., applications of such applications are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 U.S.C. § 119(e) for provisional patent applications, for any and all parent, grandparent, great-grandparent, etc., applications of the Priority Application(s)). In addition, the present application is related to the "Related Applications," if any, listed below.

PRIORITY APPLICATIONS

This application is a divisional of U.S. Non-Provisional Patent Application No. 16/459,045, filed on Jul. 1, 2019, titled "Out-of-Plane Computer-Generated Multicolor Waveguide Holography", issuing on Jan. 3, 2023 as U.S. Pat. No. 11,543,774, which claims priority under 35 U.S.C. § 119(e) to U.S. Provisional Patent Application No. 62/692,907, filed on Jul. 2, 2018, titled "Systems and Methods for Out-of-Plane Computer-Generated Multicolor Waveguide Holography," both of which are hereby incorporated by reference in their entireties.

RELATED APPLICATIONS

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc., applications of the Priority Applications and the Related Applications, including any priority claims, is incorporated herein by reference to the extent such subject matter is not inconsistent herewith.

TECHNICAL FIELD

This disclosure relates to waveguide hologram formation. More specifically, this disclosure relates to multicolor, computer-generated holograms that do not rely on traditional interference patterns of reference and object waves recorded on a photosensitive medium.

BRIEF DESCRIPTION OF THE DRAWINGS

Non-limiting and non-exhaustive embodiments of the disclosure are described herein, including various embodiments of the disclosure with reference to the figures listed below.

FIG. 2A illustrates a K-space diagram for a grating coupler, according to one embodiment.

FIG. 2B illustrates a K-space diagram for optical radiation incident directly on a hologram surface, according to one embodiment.

FIG. 2C illustrates a K-space diagram of a multicolor metasurface hologram, according to one embodiment.

FIG. 2D illustrates a cross-sectional view of a dielectric out-of-plane waveguide holography system, according to one embodiment.

DETAILED DESCRIPTION

Figure 1:
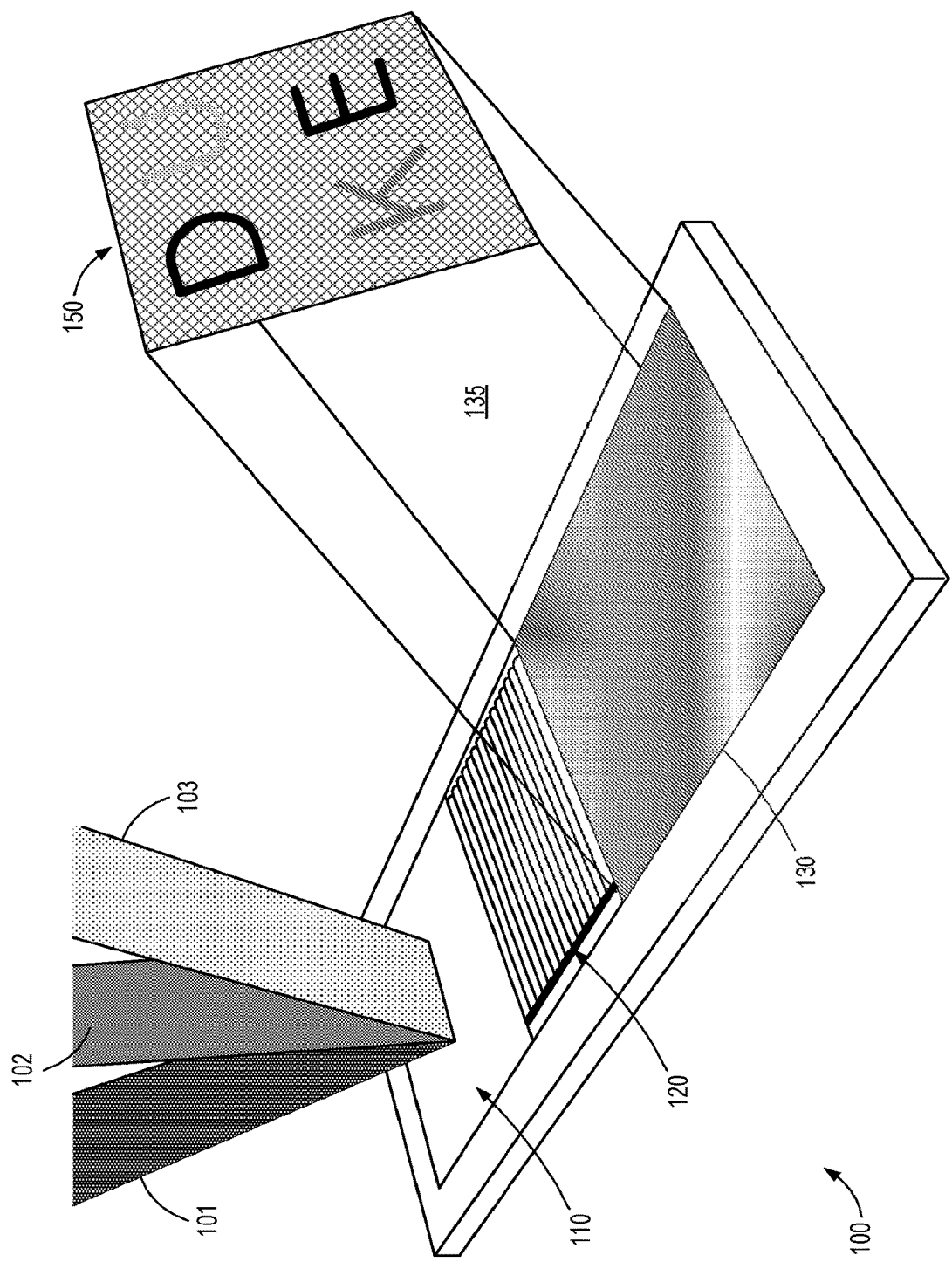
FIG. 1 illustrates a three-dimensional conceptual block diagram of an out-of-plane multicolor waveguide holography system, according to one embodiment.

This disclosure includes various systems, apparatuses, and methods for generating multicolor out-of-plane holograms, including via multilayer, all-dielectric waveguide holography systems. In various embodiments, a multicolor waveguide holography system includes an input grating coupler to couple three colors of free-space optical radiation at different incident angles into a waveguide. The waveguide conveys the optical radiation in-plane to a binary metasurface hologram. The binary metasurface hologram decouples the optical radiation for out-of-plane propagation to generate a multicolor holographic image, within a region bounded by a range of target propagation angles in free space.

In various embodiments, a controller calculates an independent hologram for each color of the optical radiation. The color-specific holograms are multiplexed to determine a single multicolor hologram that can be reproduced based on the binary metasurface hologram. The optical radiation of each color propagates within the waveguide with a distinct propagation constant prior to being decoupled by the binary metasurface hologram for propagation at different angles in free space to form an out-of-plane (off-plane) multicolor holographic image.

The input grating coupler may receive light from three different color laser sources (e.g., red, green, and blue) and couple the received light into a waveguide. The input grating coupler may be, for example, a single-period grating to couple each color of the optical radiation into the waveguide for propagation at a distinct spatial frequency. In various embodiments, the system may incorporate an all-dielectric waveguide to convey the optical radiation to the binary metasurface hologram. The binary metasurface hologram may be fabricated or dynamically tuned to match a computer-generated hologram.

The multicolor holographic image is decoupled to form the target image in the far field based on a computer-generated binary metasurface hologram. The described systems can be manufactured without beam splitters, prisms, mirrors, or lenses. Accordingly, ultraminiature systems can be manufactured for use with, for example, augmented and virtual reality displays.

A multicolor waveguide holography system may include subwavelength-diffractive elements and metamaterials for precise control of a wavefront as it is propagated into free space. In some embodiments, the binary metasurface hologram is manufactured to match a computer-generated hologram calculated to produce a target out-of-plane image hologram. In other embodiments, the binary metasurface hologram comprises active subwavelength-diffractive elements and/or metamaterials that can be dynamically tuned or controlled to reproduce a calculated computer-generated hologram.

For example, a controller may dynamically modify the phase, amplitude, polarization, and/or one or more nonlinear electromagnetic wave properties of one or more subwavelength elements in a metasurface to correspond to a computer-generated hologram. A controller may calculate a holographic pattern corresponding to a target multicolor image and then modify a dynamically reconfigurable metasurface to approximate the calculated holographic pattern. In some examples, the calculated holographic pattern may be a binary holographic pattern. In such instances, the dynamically reconfigurable metasurface may be modified to perfectly approximate or closely approximate the calculated binary holographic pattern.

In contrast to the above-identified holography techniques, the presently described systems and methods provide an input grating coupler that couples and combines three colors of light incident at different angles into a waveguide without the use of beam splitters, prisms, lenses, etc. Optical radiation inside the waveguide propagates orthogonally to the binary metasurface hologram, which results in a relatively large phase variation when compared with traditional beam-split free-space holography approaches and the transmission or reflection metasurface holography. Many embodiments of the presently described waveguide holography systems and methods utilize binary metasurface holograms that are much simpler to calculate, manufacture, and/or tune than the holograms required for traditional reflection and transmission metasurface holography. Additionally, many embodiments of the presently described waveguide holography systems and methods can be easily combined with other optical and/or electrical circuits and allow for multilayer, all-dielectric fabrication.

In various embodiments, a single input grating coupler is fabricated to accommodate all three colors. Fabricating the input grating coupler for all three colors in a single lithography step improves the quality of the holography system by providing for improved registration and reproduction of features). In various embodiments, light-emitting diodes (LED) lasers may transmit optical radiation (e.g., red, green, and blue) that is incident on the input grating coupler at different angles.

Most of the embodiments and examples described herein feature external optical radiation sources incident on the grating coupler at various angles. However, many of these embodiments can be adapted to utilize in-plane illumination from optical sources, such as in-plan LEDs. In-plane multicolor illumination embodiments may include an edge-excited metasurface hologram as part of a multicolor, all-dielectric, multilayer waveguide holography system. Accordingly, the examples and embodiments described herein may be modified to utilize in-plan illumination from in-plane optical sources. The waveguide holography techniques described herein may utilize adaptations of the edge-excited principles described in the References section of "Out-of-plane computer-generated multicolor waveguide holography" by Z. Huang et al. Optica, Vol. 6, No. 2 (2019) available at https://doi.org/10.1364/OPTICA.6.000119 (hereinafter, the "Optica Paper"), which is hereby incorporated by reference in its entirety to the extent it is not inconsistent herewith.

Red, green, and blue laser light is used in many of the examples herein as an example of three colors that can be used to generate holograms having a relatively wide color gamut. However, alternative colors may be used and/or fewer than three colors may be used in applications in which a narrower color gamut is acceptable. For example, a two-color system may be suitable in some applications. In some embodiments, in-plane LED sources may produce the optical light beams that are coupled into the waveguide via an in-plane grating coupler.

Throughout the figures, different colors are represented by different line patterns and fill patterns. For example, short dashed lines and lighter fill patterns are generally used to represent red; medium dashed lines and medium fill patterns are generally used to represent green, and solid lines and darker fill patterns are generally used to represent blue. In many instances, corresponding color drawings can be found in the provisional patent application to which this application claims priority and in the Optica Paper incorporated by reference above.

Many existing computing devices and infrastructures may be used in combination with the presently described systems and methods. Some of the infrastructure that can be used with embodiments disclosed herein is already available, such as general-purpose computers, computer programming tools and techniques, digital storage media, and communication links. A computing device or controller may include a processor, such as a microprocessor, a microcontroller, logic circuitry, or the like. A processor may include one or more special-purpose processing devices, such as an application-specific integrated circuit (ASIC), a programmable array logic (PAL), a programmable logic array (PLA), a programmable logic device (PLD), a field-programmable gate array (FPGA), or another customizable and/or programmable device. The computing device may also include a machine-readable storage device, such as non-volatile memory, static RAM, dynamic RAM, ROM, CD-ROM, disk-based memory, tape-based memory, magnetic memory, optical memory, flash memory, or another machine-readable storage medium. Various aspects of certain embodiments may be implemented using hardware, software, firmware, or a combination thereof.

The components of the disclosed embodiments, as generally described and illustrated in the figures herein, could be arranged and designed in a wide variety of different configurations. Furthermore, the features, structures, and operations associated with one embodiment may be applied to or combined with the features, structures, or operations described in conjunction with another embodiment. In many instances, well-known structures, materials, or operations are not shown or described in detail to avoid obscuring aspects of this disclosure.

The embodiments of the systems and methods provided within this disclosure are not intended to limit the scope of the disclosure but are merely representative of possible embodiments. In addition, the steps of a method do not necessarily need to be executed in any specific order, or even sequentially, nor do the steps need to be executed only once.

FIG. 1 illustrates a three-dimensional conceptual block diagram of an out-of-plane multicolor waveguide holography system 100, according to one embodiment. In the illustrated embodiment, incident blue 101, green 102, and red 103 optical radiation (e.g., laser light) are incident on a grating coupler 110. The grating coupler 110 couples the blue 101, green 102, and red 103 optical radiation, which are each received at a different incident angle, into a waveguide 120. A binary metasurface hologram 130 is tuned, programmed, or fabricated to decouple the optical radiation for out-of-plane propagation within an intended range of angles (represented by the space 135) to reconstruct a multicolor holographic image 150 in free space. For example, a binary metasurface hologram 130 may comprise active sub-wavelength elements, such as metamaterial elements, that can be dynamically tuned or programmed. In other embodiments, a binary metasurface hologram 130 may include an integrated spatial light modulator, such as a liquid crystal layer, that can be voltage-controlled to modify the two-dimensional spatial propagation properties of the binary metasurface hologram 130.

In the illustrated embodiment, the letters "D" and "E" are projected in blue, the letter "K" is projected in green, and the letter "U" is projected in red. The binary metasurface hologram 130 embodies a computer-generated hologram calculated by a computer, controller, or another electronic device. In some embodiments, the metasurface hologram 130 is tuned, programmed, or fabricated to modify the wavefront of the optical radiation conveyed by the waveguide 120 to generate the multicolor holographic image 150. In many of the embodiments described herein, the metasurface hologram 130 may be a binary metasurface hologram. In other embodiments, increased wavelength selectivity, increased phase and/or amplitude control, and/or improved imaging may be obtained by using a non-binary metasurface hologram. A non-binary metasurface hologram may increase the size, cost, and/or complexity of the waveguide holography system. Accordingly, a binary metasurface hologram may be preferred for some applications, and a non-binary metasurface hologram may be preferred in other applications.

FIG. 2A illustrates a K-space diagram for an input grating coupler, according to one embodiment. The illustrated K-space diagram is applicable to free space optical radiation in the air being coupled to the waveguide via a grating pattern formed in a material with low absorption in the optical range, such as $TiO_2$ or an electron beam resist, ZEP, that is positioned on top of a $SiO_2$ layer. In the context of the previously described system, a multicolor waveguide holography system may include a grating coupler to couple free-space optical radiation (e.g., red, green, and blue LED laser light) at different incident angles into a waveguide. The waveguide may convey the optical radiation in-plane to a binary metasurface hologram. The optical radiation is decoupled out-of-plane to generate a multicolor holographic image in a range of target angles in free space. In various embodiments, a controller (e.g., FPGA, processor, microprocessor, hardware circuitry, an ASIC, etc.) calculates an independent hologram for each color of the optical radiation. The color-specific holograms are then multiplexed to calculate a single multicolor hologram. The computer-controlled binary metasurface hologram is fabricated, tuned, or otherwise manipulated to embody the multiplexed, multicolor hologram.

The example K-space diagram in FIG. 2A corresponds to a grating period based on the propagation constants, $K_r$, of each color of optical radiation within the waveguide. Specifically, the grating period in the ZEP layer is calculated to satisfy phase-matching Equation 1 below such that only the -1st order diffracted waves propagate through the waveguide to the binary metasurface hologram.

$$mK\hat{} = K_{x,inc} - K_r \qquad \text{Equation 1}$$

In Equation 1, m is an integer, $K\hat{}$ is the wave vector relating to the grating, and $K_r$ corresponds to the fundamental propagation constant of each respective color in the waveguide. The radii of the concentric semicircles in the K-space diagram represent the amplitudes of the wave vectors for different colors in the air (top half) and waveguide regions (bottom half), respectively.

FIG. 2B illustrates a K-space diagram for optical radiation incident directly on a hologram surface, according to one embodiment. As illustrated, optical radiation incident directly on the hologram results only in zero-order reflections and only at angles outside of the optical radiation reconstruction region for forming the projected hologram of a target image.

FIG. 2C illustrates a K-space diagram of a multicolor metasurface hologram decoupling the optical radiation conveyed by the waveguide, according to one embodiment. As illustrated, only optical radiation that is part of the -1st order diffraction participates in forming the projected holographic image. The projected holographic image is reconstructed over a target range of angles. The reconstructed optical radiation forms the projected holographic image. In many embodiments, the projected holographic image can be viewed directly by human eyes (e.g., on a screen) without any other visual tools or collected by an imaging system (e.g., a collector lens with a digital camera).

With continued reference to FIGS. 2A-2C, the single-period input grating coupler acts to combine the three beams of different colors. As a specific example, an input grating coupler may be fabricated with a period of 280 nm. Red light may be incident at −52.7 degrees, green light may be incident at −24.1 degrees, and blue light may be incident at −5.8 degrees, represented by the angle, α, in the illustrated diagrams. The negative sign of the incident angles indicates that the light sources come from the right side of the gratings. The light sources may be configured so as not to interfere with the decoupled holographic images directed in the other direction at a target range of angles (shown as a light fill in the upper left quadrant of each graph). In the illustrated examples, there are two diffraction orders of waves in the transmission region for each light source, but only the $-1^{st}$ order waves are propagated by the waveguide to the metasurface hologram for decoupling.

FIG. 2D illustrates a cross-sectional view of an all-dielectric out-of-plane waveguide holography system 200, according to various embodiments. Per various embodiments and as illustrated, a waveguide cladding layer 202 of $SiO_2$ may be formed on a substrate base layer 201 of Si. The ZEP layer 203 serves as a planar waveguide 250 coupling optical radiation between the input grating coupler 225 and the metasurface hologram 275. That is, the ZEP layer 203 is used structurally and not as a mask. As previously described, $-1^{st}$ order incident optical radiation (e.g., red, green, and blue laser light) on the input grating coupler 225 is conveyed by the planar waveguide 250 to the metasurface hologram 275. The planar waveguide 250 may be clad by air, a vacuum, or another material on one side and the $SiO_2$ layer 202 on the other side. Ultimately, the optical radiation is decoupled by the computer-programmed metasurface hologram 275 to propagate the three colors of optical radiation within a target range of angles in a region 290 (shown with a medium gray fill) to form a target image hologram. Example propagation angles are illustrated in FIG. 2D, but may vary based on the intended application.

Any of a wide variety of nanofabrication techniques may be utilized to fabricate the illustrated multicolor waveguide holography structure. For example, plasma-enhanced chemical vapor deposition (PECVD) may be used to deposit the relatively thin (e.g., two micrometers) $SiO_2$ waveguide cladding layer 202 on the Si substrate 201. Electron-beam lithography (EBL) may be used to form the grating for the input grating coupler 225 and/or to form the subwavelength elements (e.g., metamaterials) of the binary metasurface hologram 275 in a ZEP layer 203. The grating in the input grating coupler 225 may, for example, be formed using EBL with an electron beam resist of ZEP-520A (or simply "ZEP," as used herein) or $TiO_2$. The ZEP layer 203 may be, for example, 300 nanometers. The ZEP layer 203 may be applied via spin coating to achieve a target thickness based on spin speed and dilution with another solution.

In various embodiments, the etch depth and feature sizes of the diffraction grating in the input grating coupler 225 and other subwavelength elements in the metasurface hologram 275 may be, for example, between approximately 30 nanometers and 100 nanometers. The metasurface hologram 275 may be rectangular or square with a perimeter between approximately 300 micrometers and 1200 micrometers. Different sizes, dimensions, etch depths, feature sizes, perimeter measurements, and shapes are possible and may be useful for particular applications. For example, a circular metasurface hologram may be utilized instead of the illustrated rectangular metasurface hologram 275.

Figure 3A:
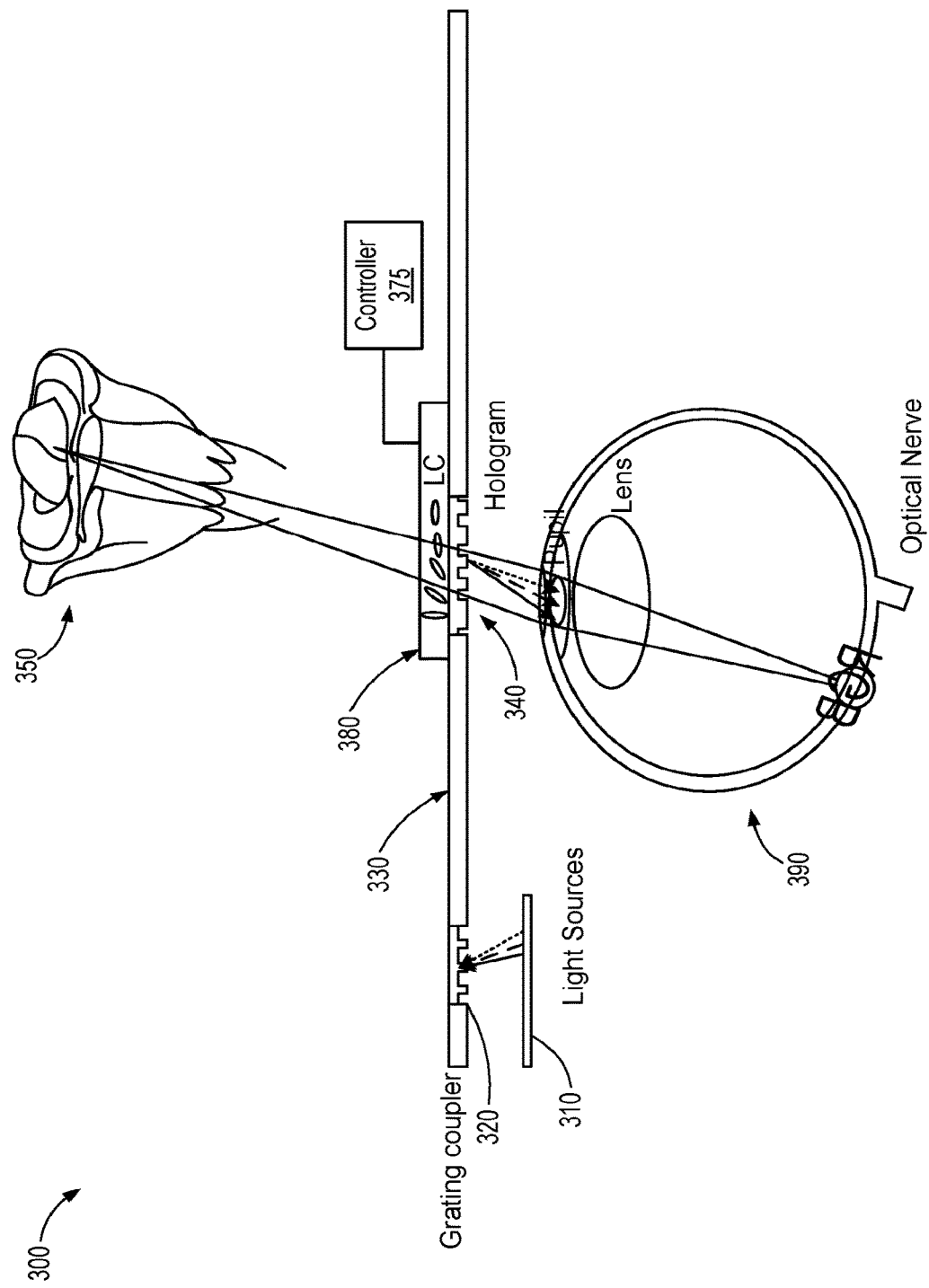
FIG. 3A illustrates an example of an augmented reality system using dielectric out-of-plane waveguide holography, according to one embodiment.

FIG. 3A illustrates an example of an augmented reality system 300 using dielectric out-of-plane waveguide holography, according to one embodiment. In the illustrated example, a light source 310 (such as red, green, and blue LED lasers) transmits multicolor optical radiation incident on grating coupler 320 at different, color-based angles of incidence. The optical radiation is conveyed by a waveguide 330 that is in-plane relative to the grating coupler 320 and a computer-controlled binary metasurface hologram 340. The binary metasurface hologram 340 is programmed to decouple the multicolor optical radiation for out-of-plane propagation to form a target image hologram within a region defined by target propagation angles. In the illustrated example, the target image hologram is formed within a region proximate to a pupil of an eye 390 of a user.

In the illustrated embodiment, a flower 350 exists in the real world and may be visible through the binary metasurface hologram 340 and the liquid crystal layer 380. A generated holographic image produced by the binary metasurface hologram 340 may, at least from the perspective of the user's eye 390, overlap the real-world flower 350. Active control of the visibility, relative brightness, effective transparency, and other visual characteristics of the real-world flower 350 may be modified by the liquid crystal 380 or another spatial light modulator system.

The augmented reality system 300 allows for controlled interactions between projected holographic images and real-world objects. Fixed gratings may be patterned over the liquid crystal 380 (or another spatial light modulator) so that the K-vectors or spatial frequency vectors of the superimposed fixed and adjustable gratings sum together to provide an adjustable range of spatial frequencies that are diffracted to a target range of angles. For example, liquid crystal-based modulators using liquid crystal on silicon (LCOS) or liquid crystal on indium tin oxide (LCITO) coated conductive substrates can form a waveguide slab which forms part of the binary metasurface hologram 340.

The direction of the liquid crystal domains may be modulated by applying a voltage to the domains. Voltage-controlled spatial modulation of the liquid crystal 380 allows for precise control of the refractive index and birefringence of the liquid crystal 380 inside the guiding structure. The liquid crystal 380 can be voltage-controlled to form gratings that diffract and decouple the multicolor optical radiation to form multicolor target image holograms.

In another embodiment, longitudinal gratings are formed in a waveguide slab using an acoustic-optic modulator (AOM), for example, made with a tellurium dioxide ($TeO_2$) or silicon dioxide ($SiO_2$) waveguide layer. While many of the systems and methods described herein are provided in the context of visual hologram image reconstruction, many of the systems, methods, and techniques described herein may be repurposed and/or adapted for other known uses for holograms, including without limitation information storing, processing and computing, anti-counterfeit technology, smart-phone holographic displays, augmented reality systems, virtual reality systems, displays, advertising, productivity systems, etc.

Figure 3B:
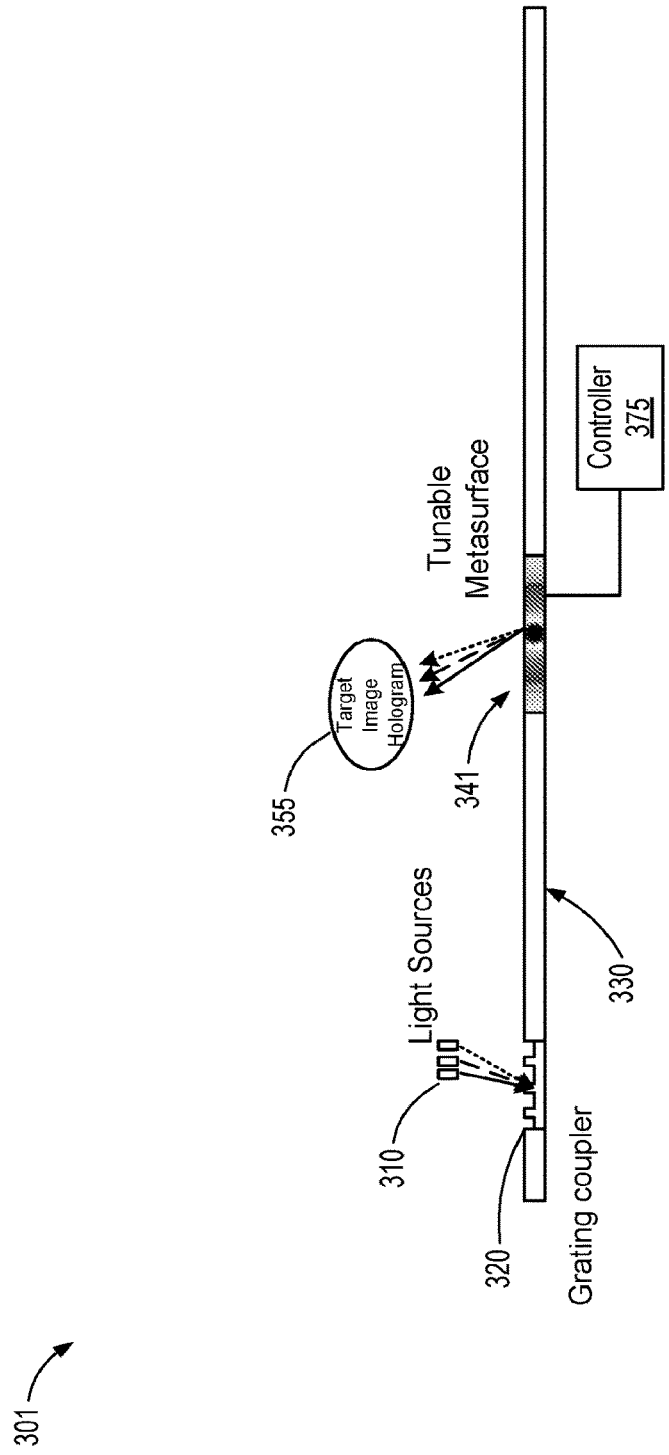
FIG. 3B illustrates an example of a dielectric out-of-plane waveguide holography system with a dynamically tunable metasurface hologram, according to one embodiment.

FIG. 3B illustrates a simplified block diagram of an example dielectric out-of-plane waveguide holography system 301 that is similar to the simplified block diagram shown in FIG. 3A. Light sources 310 illuminate grating coupler 320 at different angles of incidence. The grating coupler 320 combines and couples the light from light sources 310 to a tunable metasurface 341 via an in-plane waveguide 330. In the illustrated embodiment, rather than manufacturing a static hologram as an etched grating-like pattern, a dynamically tunable metasurface 341 is controlled by controller 375. The dynamically tunable metasurface 341 can be tuned to propagate the light from the waveguide 330 out-of-plane for convergence within a region to form a target image hologram. The controller 375 may dynamically modify the tunable metasurface 341 to modify the out-of-plane target image hologram.

Figures 4A, 4B:
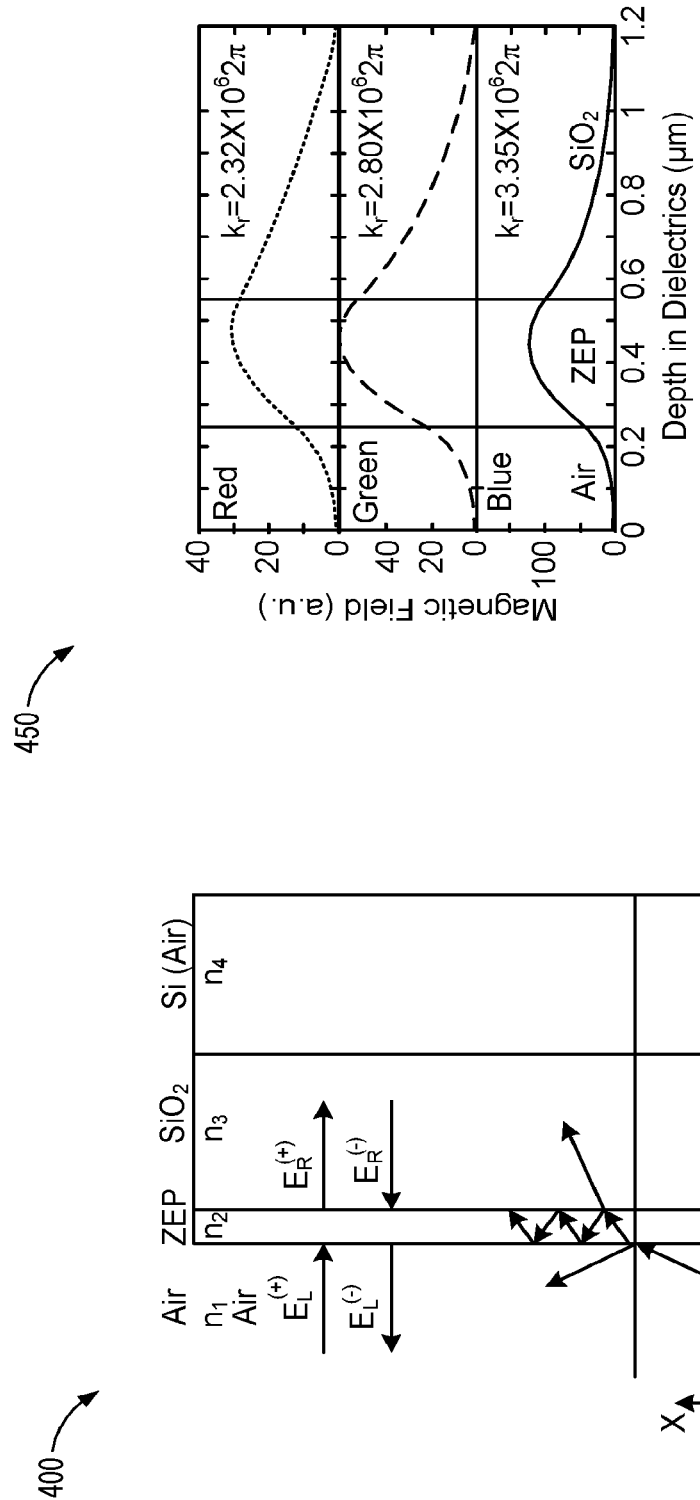
FIG. 4A illustrates an optical transfer matrix in a multi-layer waveguide holography system, according to one embodiment.
FIG. 4B illustrates a graph of the fundamental modes of red, green, and blue on a graph of the magnetic field relative to the depth of the dielectric layers, according to one embodiment.

FIG. 4A illustrates an optical transfer matrix 400 in a multilayer waveguide holography system, according to one embodiment. In some embodiments, calculations of guide modes for the core and cladding layers can be made with an assumption that all the dielectric materials are lossless. The optical transfer matrix method for a multilayer system can be used to calculate the propagation modes in the waveguide, as described in "Optics of Thin Films (An Optical Multilayer Theory)," by Z. Knittl (Wiley, 1976).

As illustrated, when the waves are guided by the dielectric layers, no input fields exist as the mode is substantially confined to the metasurface ZEP layer, such that: $E_R^- = E_L^+ = 0$. On the other hand, the fields on the right side of a ZEP layer are related to those on the left side through a transfer matrix with coefficients of A, B, C, and D such that $E_R^- = CE_L^+ + DE_L^-$. Since $E_L^- \neq 0$, the propagation constants for guided modes correspond to the coefficient D=0 case, and all possible modes can be obtained. For a sufficiently thin guiding layer, only the fundamental mode for each color is considered, since it has the largest propagation constant and most of the energy is confined within the waveguide.

FIG. 4B illustrates a graph 450 of the fundamental modes of red (e.g., 635 nanometers), green (e.g., 532 nanometers), and blue (e.g., 450 nanometers) on a graph of the magnetic field relative to the depth of the dielectric layers, according to one embodiment. It is appreciated that any number of colors may be used having any of a wide variety of specific wavelengths. As illustrated, the left-most portion of the graph corresponds to the free space air, the middle portion with the highest magnetic field corresponds to the ZEP layer, and the right-most portion of the graph shows the magnetic field of each color decreasing with increasing depth into the $SiO_2$ layer. FIG. 4B illustrates example fundamental propagation constants, $K_r$, for each of the three colors that can be used in conjunction with Equation 1 above to calculate the grating pattern for the input grating coupler described in conjunction with FIGS. 2A-2D.

Figure 5A:
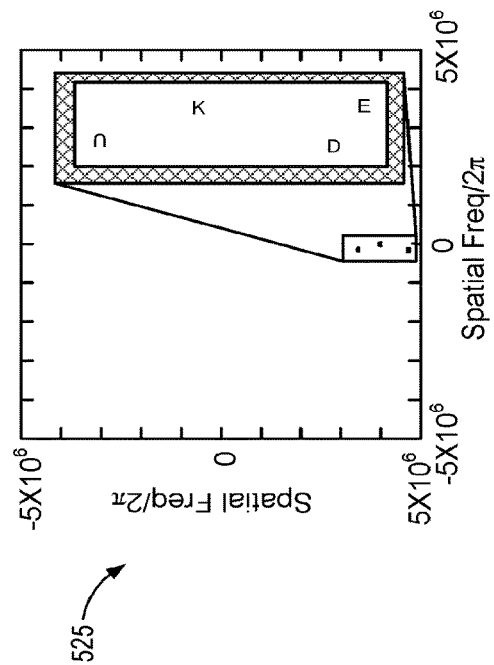
FIG. 5A illustrates a multicolor real-world object for out-of-plane holographic projection, according to one embodiment.

FIG. 5A illustrates a multicolor real-world object 500 for out-of-plane holographic projection, according to one embodiment. As previously described, to generate an out-of-plane holographic projection of the real-world object 500, the waveguide holography system may begin by receiving red, green, and blue light incident on an input grating coupler at different angles of incidence. The input grating coupler couples the red, green, and blue light into a waveguide for conveyance to the binary metasurface hologram. Each of the red, green, and blue light propagates within the waveguide at a distinct spatial frequency for controlled decoupling and out-of-plane propagation by the computer-controlled binary metasurface hologram.

Accordingly, given an input target image, such as the multicolor lettering in the real-world object 500, a computer-generated hologram needs to be programmed into the binary metasurface hologram. In various embodiments, the output angles from the metasurface hologram for each of the different colors are mapped to disjoint regions of the colors' spatial frequencies in a single Fourier space. The hologram reassembles the different color components into a common field of view, creating a multicolor image. Full-color images over a wide gamut of colors are possible by spatially mixing the red, green, and blue color components, as illustrated in the Optica Paper cited above. However, the illustrated examples maintain spatially separate red, green, and blue letters to illustrate the principle.

As previously described in conjunction with FIG. 2D, the angles of the decoupled waves vary from −35° to −45° in the x-direction and from −5° to +5° in the y-direction. The coupling between the K-vector of the guided waves (given by the propagation constants) and the free-space K-space vector (given by the scattering angles) is discussed in conjunction with FIGS. 2A-2D and FIGS. 4A and 4B. In FIG. 5A, different fill patterns are used to represent the spatially separate red, green, and blue letters. Specifically, the "D" and "E" letters are blue, the "U" letter is red, and the "K" letter is green. The letters are placed on a black background such that additional light is not required to generate the background.

Figure 5B:
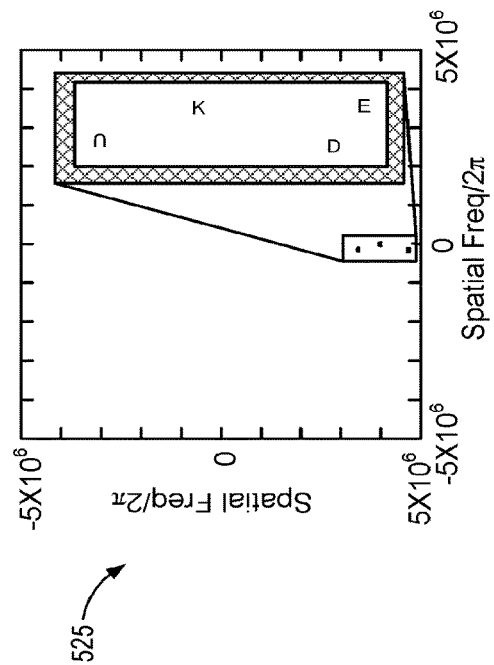
FIG. 5B illustrates the spatial frequencies in a Fourier plot of the separated red, green, and blue color components, according to one embodiment.

FIG. 5B illustrates the amplitudes of the spatial frequencies in a Fourier plot 525 of the separated red, green, and blue color components of the four letters, according to one embodiment. In the illustrated embodiment, the red "U" has the lowest spatial frequency, while the blue "D" and "E" letters have the highest spatial frequency and are grouped together. The green "K" has a middle spatial frequency. The amplitudes of the spatial frequencies for the three-color letters are disjoint, which means that the decoupling angles are separated in free space.

Figure 5C:
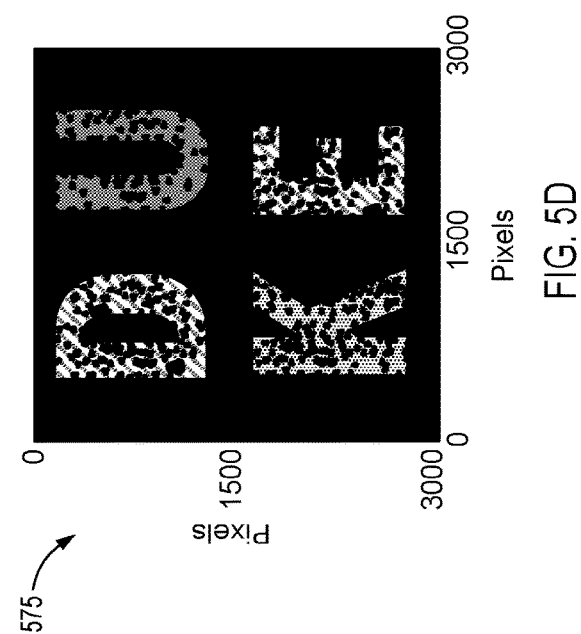
FIG. 5C illustrates a binary hologram calculated via an iterative Fourier transform algorithm, according to one embodiment.

FIG. 5C illustrates a binary hologram calculated via an iterative Fourier transform algorithm (IFTA), according to one embodiment. The IFTA algorithm is also known as the Gerchberg-Saxton algorithm and can be used to calculate a binary hologram. The calculated binary hologram can be reproduced by the programmable binary metasurface hologram, as described herein. For example, the binary metasurface hologram may be permanently fabricated to match the calculated binary hologram through electron beam etching. Alternatively, tunable or modifiable metamaterial elements may be dynamically tuned to reprogram the binary metasurface hologram to match the calculated binary hologram. In still other embodiments, voltage-controlled liquid crystal and/or other spatial light-modulating layers may be controlled to superimpose fixed and/or adjustable gratings that form part of a dynamically reprogrammable binary metasurface hologram.

The spatially distinct multicolor optical radiation is conveyed by the waveguide to the programmed binary metasurface hologram. The programmed binary metasurface hologram decouples the optical radiation for free-space propagation to form a target image hologram within a region defined by the propagation angles of the binary metasurface hologram.

Figure 5D:
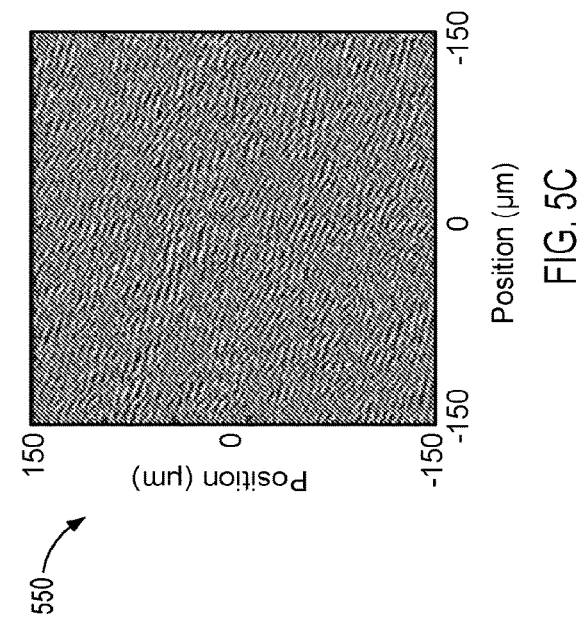
FIG. 5D illustrates an example of a theoretically reconstructed holographic projection of the object of FIG. 5A based on the computer-generated binary hologram using an out-of-plane waveguide holography system, as described herein.

FIG. 5D illustrates an example of a theoretically reconstructed holographic projection of the object of FIG. 5A based on a computer-generated binary hologram using an out-of-plane waveguide holography system as described herein. The illustrated imperfections are exaggerated to show some of the possible quality compromises and possible improvements associated with limitations associated with the use of a binary hologram that can store limited information and/or exhibits relatively weak control of phase and amplitude as compared to multistate hologram embodiments. Specifically, a larger binary metasurface hologram and/or a metasurface hologram comprising a volumetric disbursement of nanoparticles may be able to more closely approximate an ideally-calculated computer-generated hologram, in some instances.

Figure 6A:
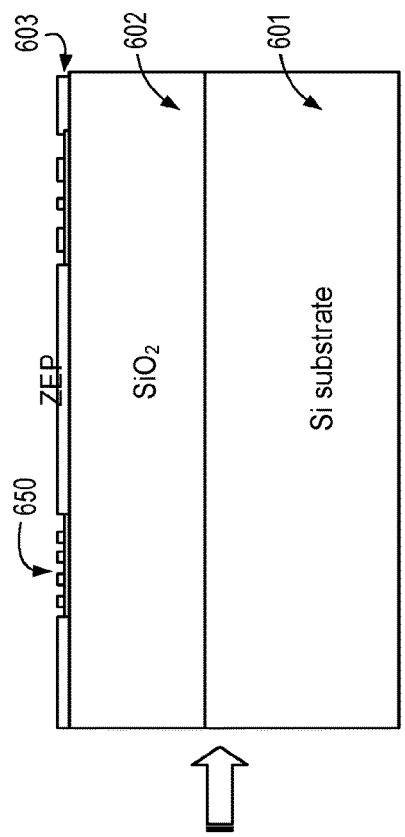
FIG. 6A illustrates a $SiO_2$ layer formed on top of a Si substrate in an early step of the fabrication process of a multicolor waveguide holography system, according to one embodiment.

FIG. 6A illustrates a $SiO_2$ cladding layer 602 formed on top of a Si substrate 601 in an early step of the fabrication process of a multicolor waveguide holography system, according to one embodiment. The illustrated example is similar to that shown and described in conjunction with FIG. 2D and similar fabrication techniques may be utilized.

Figure 6B:
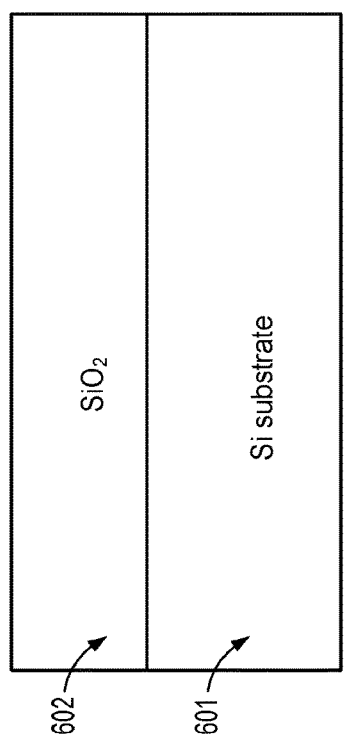
FIG. 6B illustrates a grating coupler and a hologram decoupler formed in a ZEP layer on top of the $SiO_2$ cladding layer, according to one embodiment.

FIG. 6B illustrates a grating coupler 650 formed in a ZEP layer 603 on top of the $SiO_2$ cladding layer 602, according to one embodiment.

Figure 6C:
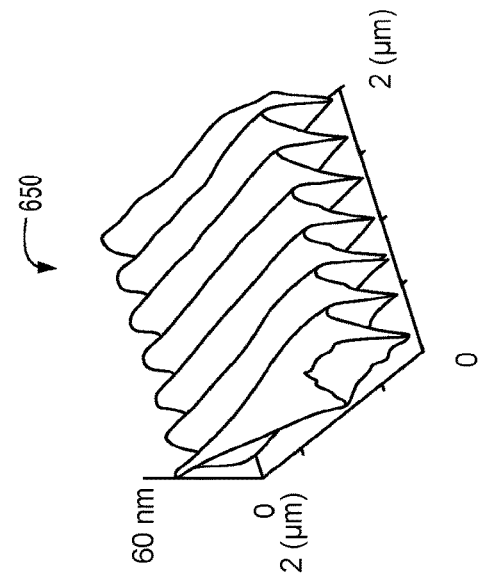
FIG. 6C illustrates an example close-up view of the fabricated hologram captured via a scanning electron microscope, according to one embodiment.

FIG. 6C illustrates an example close-up view of a comparison between the design and fabricated hologram pattern 650 captured via a scanning electron microscope, according to one embodiment.

Figure 6D:
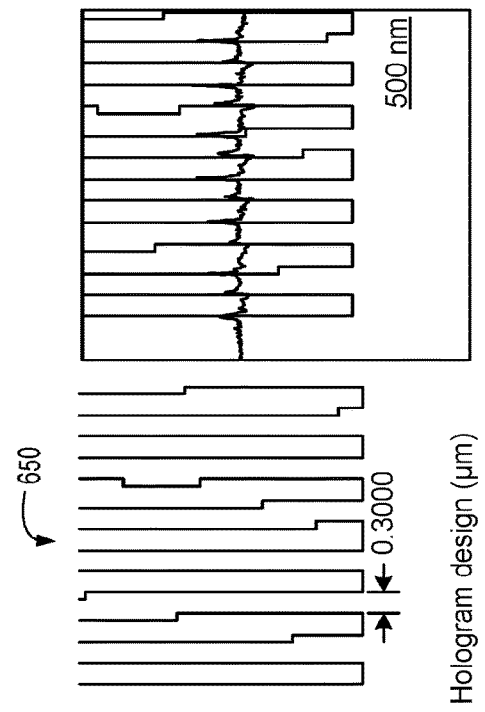
FIG. 6D illustrates an example close-up perspective view of the grating pattern of the grating coupler captured via an atomic force microscope, according to one embodiment.

FIG. 6D illustrates an example close-up perspective view of the grating pattern of the grating coupler 650 captured via an atomic force microscope, according to one embodiment. The example etching depth of the grating pattern in FIG. 6D is shown as approximately 60 nanometers.

Figure 7A:
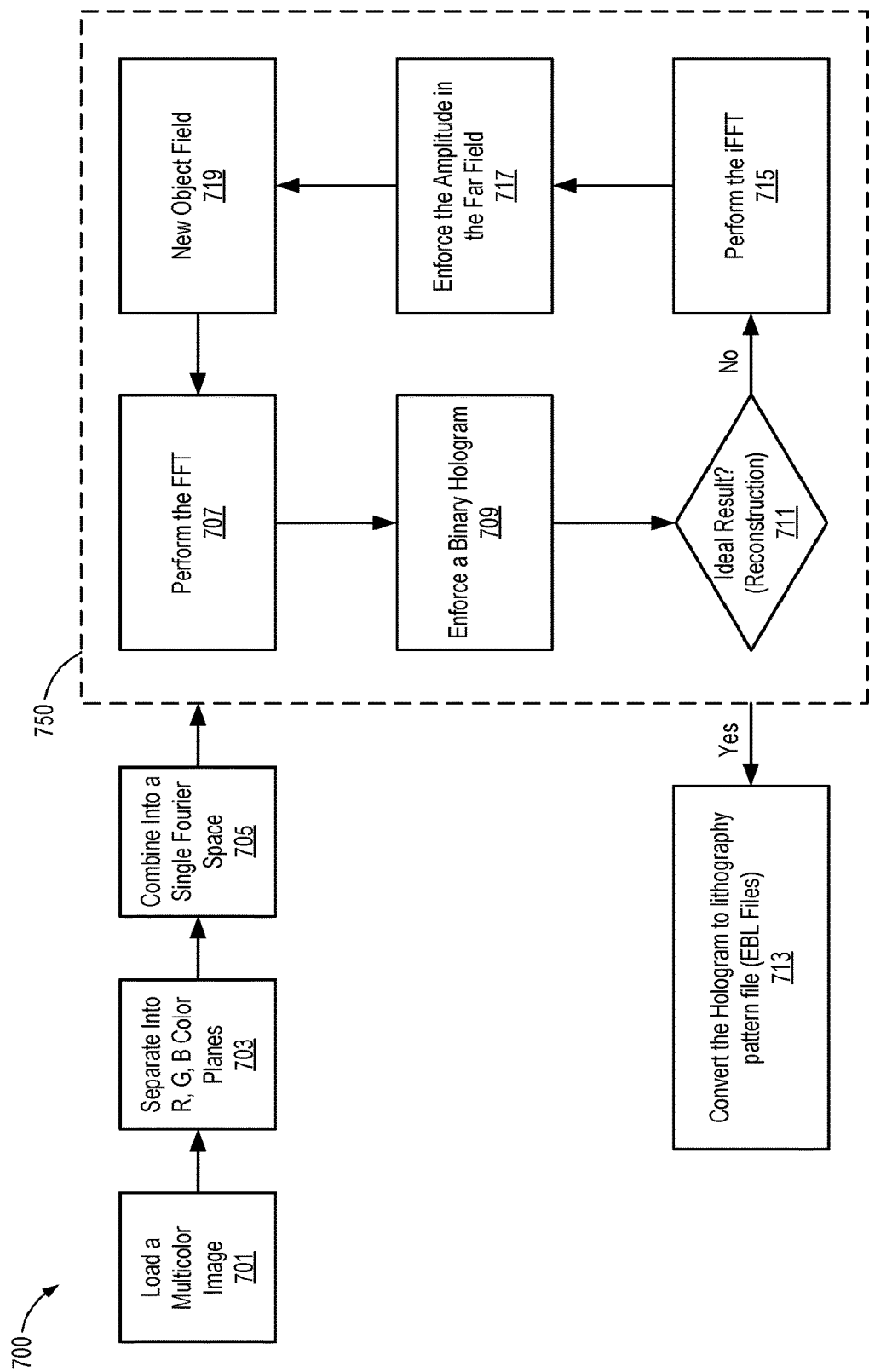
FIG. 7A illustrates an example flowchart for generating the lithography pattern file for a static, multicolor holographic image, according to one embodiment.

FIG. 7A illustrates an example flowchart 700 for generating a lithography pattern file for a static, multicolor holographic image. A multicolor image is selected and loaded 701 into a controller (e.g., a processor-based computer, an ASIC, an FPGA, electronic circuitry, etc.). The multicolor image is separated 703 into component red, green, and blue color planes. The three different color planes are multiplexed or otherwise combined 705 into a single Fourier space. The combined red, green, and blue color planes are provided as inputs into a Gerchberg-Saxton process 750 to calculate a binary hologram. The Gerchberg-Saxton process 750 is an iterative process shown in a simplified block diagram that may repeat many times. The iterative process includes a fast-Fourier transform 707, followed by an enforced binary hologram 709. If the enforced binary hologram is an ideal result, at 711, then the Gerchberg-Saxton process 750 ends and the calculated binary hologram is converted to a lithography pattern file for electron beam etching at 713, as illustrated and described in conjunction with FIG. 2D.

Otherwise, if an ideal binary hologram has not been calculated at 711, an inverse-fast-Fourier transform is performed 715, and an amplitude is enforced in the far field 717 to identify a new object field 719. The new object field 719 is used as the basis to perform another fast-Fourier transfer 707, and the process is repeated until the enforced binary hologram 709 is sufficiently close to an ideal hologram, at 711, for the process to end.

Figure 7B:
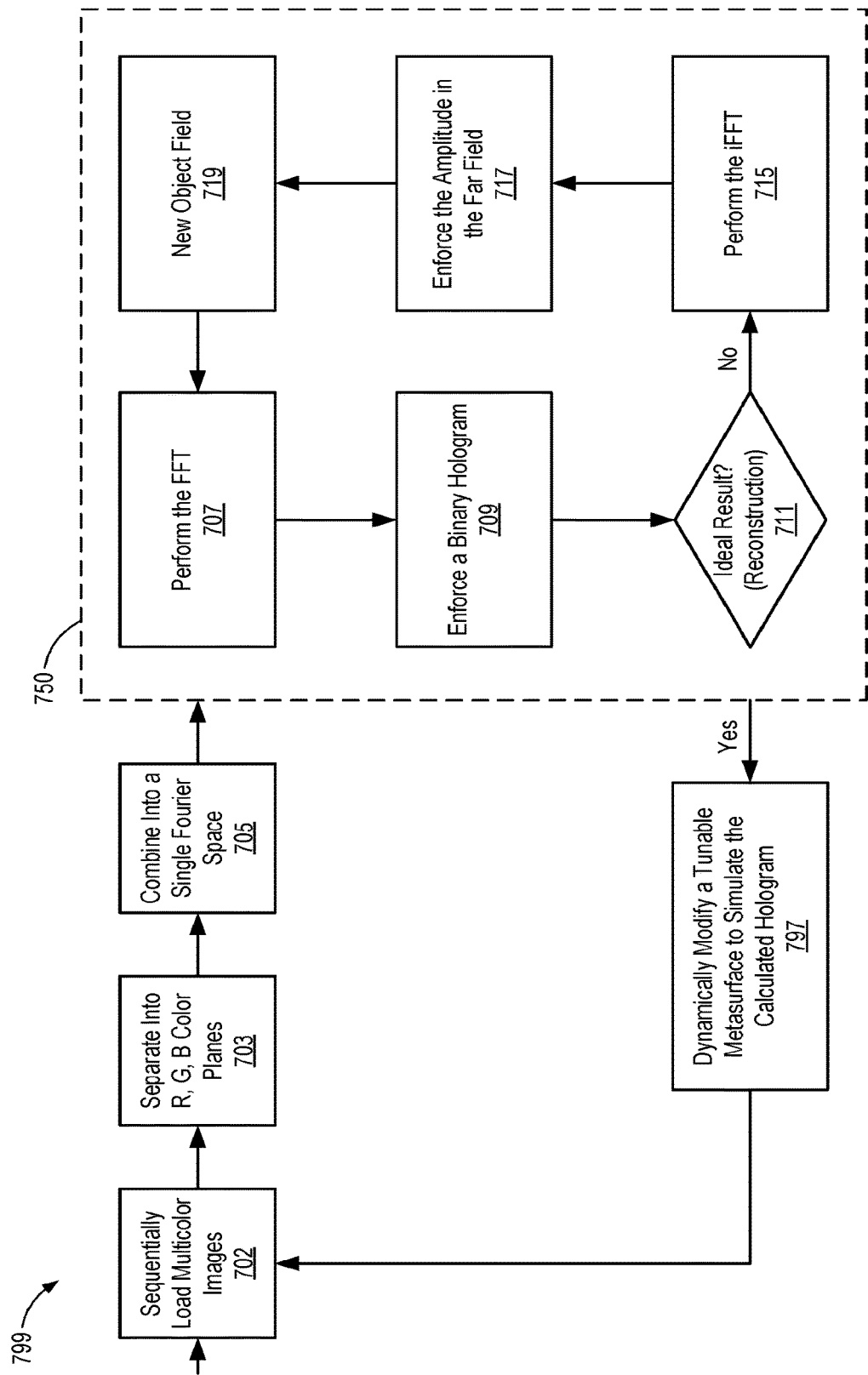
FIG. 7B illustrates an example flowchart for dynamically modifying a tunable metasurface to generate dynamic multicolor holographic images, according to one embodiment.

FIG. 7B illustrates an example flowchart 799 that is similar to the process described in conjunction with FIG. 7A. However, once an enforced binary hologram 709 is found to be sufficiently close to an ideal hologram, at 711, the calculated binary hologram is used to dynamically modify 797 a tunable metasurface, such as the tunable metasurface described in conjunction with FIG. 3B. Multicolor images can be sequentially loaded, at 702, for dynamic modification of the tunable metasurface, at 797. The cycle can repeat for a set of multicolor images. The set of multicolor images may be a set of static images or part of a video feed. The tunable metasurface is tuned to generate a dynamic multicolor holographic image and can be re-tuned to generate a new or different holographic image multiple times in a time period.

This disclosure has been made with reference to various exemplary embodiments, including the best mode. However, those skilled in the art will recognize that changes and modifications may be made to the exemplary embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as critical, required, or essential features or elements. This disclosure should, therefore, be determined to encompass at least the following claims.

What is claimed is:

1. A dynamically reconfigurable multicolor waveguide holography system, comprising:
    a multicolor light source to transmit multiple distinct colors of optical radiation at different angles;
    a grating coupler to couple each of the distinct colors of optical radiation into a waveguide, wherein each color of optical radiation is incident on the grating coupler at a different angle of incidence;
    a waveguide coplanar with the grating coupler to convey each color of the optical radiation from the grating coupler to a metasurface hologram with a distinct spatial frequency;
    a dynamically reconfigurable metasurface hologram comprising a two-dimensional array of active subwavelength elements tunable between at least two states with different optical properties, wherein the metasurface hologram is coplanar with the grating coupler and the waveguide to decouple the distinct colors of optical radiation for off-plane propagation to form a target multicolor image as a hologram in free space; and
    a controller to:
        calculate a holographic pattern corresponding to the target multicolor holographic image, and
        modify the dynamically reconfigurable metasurface hologram by tuning the active subwavelength elements to approximate the calculated holographic pattern.

2. The system of claim 1, wherein the waveguide comprises a layer of electron beam resist deposited on a dielectric cladding layer.

3. The system of claim 2, wherein the electron beam resist comprises ZEP520A.

4. The system of claim 1, wherein the multicolor light source is configured to transmit red, green, and blue light at different angles relative to the grating coupler.

5. The system of claim 1, wherein the waveguide is configured to convey the fundamental propagation guide mode of the optical radiation at each of the distinct colors of optical radiation.

6. The system of claim 1, wherein the grating coupler has a grating period based on calculated propagation constants of the waveguide for each of the distinct colors of optical radiation.

7. The system of claim 6, wherein the grating period is calculated to satisfy a phase-matching equation that is a function of the calculated propagation constants of the waveguide for each of the distinct colors of optical radiation.

8. The system of claim 1, wherein the grating coupler is configured to couple only negative first-order waves of each of the distinct colors of optical radiation.

\* \* \* \* \*